United States Patent [19]

Bott et al.

[11] Patent Number: 5,326,809
[45] Date of Patent: Jul. 5, 1994

[54] POLY[(VINYL ALCOHOL)-CO-(VINYL AMINE)] COPOLYMERS AS STABILIZING PROTECTIVE COLLOIDS IN AQUEOUS EMULSION POLYMERIZATION

[75] Inventors: Richard H. Bott, Macungie; William E. Lenney, Allentown; Keith D. Campbell, Slatington, all of Pa.; Jeffrey A. Kuphal, Flemington, N.J.; Chung-Ling Mao, Emmaus, Pa.

[73] Assignee: Air Products and Chemicals, Inc., Allentown, Pa.

[21] Appl. No.: 981,572

[22] Filed: Nov. 25, 1992

[51] Int. Cl.$^5$ .............................................. C08F 2/16
[52] U.S. Cl. .................................. 524/459; 524/503; 524/555; 526/201
[58] Field of Search ..................... 524/459, 503, 555; 526/201

[56] References Cited

U.S. PATENT DOCUMENTS

| | | | |
|---|---|---|---|
| 4,217,214 | 8/1980 | Dubin | 210/52 |
| 4,280,942 | 7/1981 | Green | 425/500 X |
| 4,308,189 | 12/1981 | Moritani et al. | 525/59 |
| 4,843,118 | 6/1989 | Lai et al. | 524/555 |
| 4,921,621 | 5/1990 | Costello et al. | 524/555 X |
| 5,011,883 | 4/1991 | Aksman | 524/513 |
| 5,086,111 | 2/1992 | Pinschmidt et al. | 525/61 |

FOREIGN PATENT DOCUMENTS

| | | |
|---|---|---|
| 072684 | 2/1983 | European Pat. Off. |
| 0489524 | 6/1992 | European Pat. Off. |
| 60-58403A | 4/1985 | Japan |

Primary Examiner—Judy M. Reddick
Attorney, Agent, or Firm—Michael Leach; James C. Simmons; William F. Marsh

[57] ABSTRACT

A method for preparing aqueous polymer emulsions in the presence of a poly[(vinyl alcohol)-co-(vinyl amine)] copolymer as a protective colloid and aqueous polymer emulsions containing a poly[(vinyl alcohol)-co-(vinyl amine)] copolymer.

29 Claims, No Drawings

POLY[(VINYL ALCOHOL)-CO-(VINYL AMINE)] COPOLYMERS AS STABILIZING PROTECTIVE COLLOIDS IN AQUEOUS EMULSION POLYMERIZATION

FIELD OF THE INVENTION

The present invention relates to the use of protective colloids, especially poly(vinyl alcohol) [PVOH], in the preparation of polymers by aqueous emulsion polymerization techniques.

BACKGROUND OF THE INVENTION

The deficiency in the industry has been the inability to balance the necessary hydrophilicity for emulsion polymerization with ultimate resistance to water in the resulting polymer products. Additionally, it has been difficult and costly to incorporate active functionality into emulsion polymers due to copolymerization considerations as well as to a lack of chemical versatility in the available functional monomers. Functional monomers are often not stable to the conditions of polymerization in aqueous emulsion systems and are, therefore, unsuited for providing appropriate and desired physical and mechanical property development in the ultimate uses of the emulsion polymer products. Typically, the functionality utilized to crosslink these emulsion polymers has been incorporated through copolymerization with the polymer itself.

Normally, aqueous polymer emulsions contain either hydrophilic polymers such as poly(vinyl alcohol) [PVOH], poly(ethylene oxide), or poly(vinyl pyrrolidone) or surfactants such as alkylphenol ethoxylates, alkyl sulfonates, or alkyl ammonium salts to allow stable polymerization in an aqueous continuous phase. Due to the necessary hydrophilicity of these materials, emulsion polymers prepared containing these materials remain sensitive to the presence of water even after polymers are cast into a solid film, as would be utilized for adhesives, for example. This water sensitivity leads to limitations in the types of applications where these emulsion polymers can be used. Emulsion polymers exhibiting this water sensitivity cannot typically be used, for example, in outdoor applications where exposure to the elements would cause degradation of polymer performance and ultimately in failure of the polymer product.

Previous solutions to this deficiency have involved incorporation of functional monomers into the emulsion polymers themselves where they remain until catalyzed or promoted to reaction by some mechanism. Typical monomers of this type are N-methylolacrylamide, hydroxyethyl acrylate, glycidyl (meth)acrylate and similar monomers. Several technical problems limit the utility of these types of monomers in addition to economic considerations. Such hydrophilic monomers are soluble in water and are therefore difficult to incorporate effectively into emulsion polymer compositions. Polymerization of these monomers in the aqueous phase can result in serious difficulty in controlling the viscosity of the dispersion and can lead to inadequate performance as crosslinking agents. Because the functional monomers are usually incorporated into the polymer with dissimilar monomers, consideration must be given for the differing reactivities of the two or more types of monomers in the system. These reactivity considerations can affect the available compositions for the individual monomers in the overall product as well as the distribution of the dissimilar monomers within the polymer molecules, thus limiting their effectiveness.

Crosslinking monomers are desirably incorporated into the polymer formed during the emulsion polymerization process. These active functionalities are then catalyzed or promoted to reaction either by a chemical process such as addition of an acid catalyst or by a physical process such as the application of heat or by some combination of both. Inherent to such utilization of these crosslinking monomers is their incorporation into the polymer formed during the polymerization in the system. Later, through catalysis or the promoted reaction, these functionalities react to form a larger molecular network which helps improve many of the physical and mechanical properties of the emulsion polymer such as the tensile strength and modulus and helps resist the degradation of properties on exposure to water or solvents.

Emulsion polymerization of monomers such as vinyl acetate, vinyl chloride and vinylidene chloride and their copolymers with ethylene or acrylates has long been known to be stabilized by protective colloids, water soluble polymers such as PVOH and hydroxyethyl cellulose. However, it has been difficult to polymerize exclusively acrylic monomers in the presence of the water soluble polymers at useful levels above 0.5% based on polymer solids.

Previous attempts to incorporate water soluble polymers such as PVOH into acrylic emulsion polymer products have focused on the post addition of the PVOH to the already polymerized acrylic emulsion. In U.S. Pat. No. 4,280,942, for example, the PVOH is added after the monomer has been completely added to the emulsion reaction. While this patent teaches the use of PVOH in an acrylic contact adhesive formulation, it does not specify in Example 1 the method of polymerization nor the means of PVOH addition to the emulsion product. Example 5 indicates that the PVOH solution is added to the emulsion after all of the monomer has been added. In addition, the examples disclosed in this patent also rely on the use of additional surfactants which act as primary emulsifier for the emulsion polymerization.

Other attempts (U.S. Pat. No. 5,011,883) have utilized copolymers of vinyl monomers such as vinyl acetate with acrylates to achieve incorporation of the PVOH into the emulsion product. This approach also has limitations in the level of vinyl acetate which can be homogeneously incorporated into the emulsion product and in the compromise in properties such as Tg that are expected due to copolymerization of the vinyl monomer with the acrylic monomers.

Other efforts have shown that incorporation of amine functionality into a polymer latex composition of acrylic polymers is desirable but the routes used to achieve this incorporation are difficult. EP 072,684 discloses the quaternization of amine functional monomers or polymers with epichlorohydrin as a route to incorporation of this functionality for adhesive compositions. EP 0,489,524 describes the preparation of amine containing emulsion products which incorporate amine functionality through the use of ammonium salts of fatty acids which are subsequently decomposed at elevated temperatures to produce acid functionality and ammonia. In that case, the conversion of the ammonium functionality used for stabilization to the thermalized acid fore results in the transformation of the compound from the water soluble to a water insoluble species.

Cationic PVOH has been used for the emulsion polymerization of acrylic and vinyl monomers (U.S. Pat. No. 4,308,189 and J 60058403A). These methods of cationic incorporation into the emulsion product rely on the copolymerization of (meth)acrylamide type monomers which typically limit the compositions of the stabilizing copolymers due to reactivity differences with vinyl acetate.

SUMMARY OF THE INVENTION

The present invention is directed to a method for the aqueous emulsion polymerization of ethylenically unsaturated monomers in the presence of a stabilizing composition. According to the present invention, the stabilizing system comprises a poly[(vinyl alcohol)-co-(vinyl amine)] copolymer [PVOH/PVAm]. One or more PVOH/PVAm's may be the sole component(s) composing the stabilizing composition or may be used in combination with other emulsifying agents (surfactants) and protective colloids.

The versatile reactivity of the primary amine functional group in the PVOH/PVAm as the stabilizing colloid for the emulsion polymerization of various monomers allows for latent crosslinking of the resulting emulsion polymers. Thus, advantageous properties and crosslinking behavior are evident when this functionality is incorporated into the emulsion system. The presence of the primary amine functionality in the stabilizing copolymer allows crosslinking chemistry to be conducted on the emulsion polymer products through the use of crosslinking compounds such as anhydride copolymers.

Contemplated as the functional equivalent of using the PVOH/PVAm in the stabilizing composition is the post-addition of the PVOH/PVAm to the aqueous emulsion and the optional, but preferable, further addition of free radical source to effect grafting.

DETAILED DESCRIPTION OF THE INVENTION

The PVOH/PVAm used as the stabilizing agent is prepared by copolymerizing vinyl acetate (VAc) and N-vinylfomamide (NVF) and hydrolyzing the resulting poly[(vinyl acetate)-co-poly(N-vinylformamide)] [PVAc/PNVF]. Depending upon the extent of the hydrolysis reaction on the acetate and formamide functionalities, the resulting PVOH/PVAm may contain unhydrolyzed vinyl acetate and/or vinylformamide units in the copolymer. Accordingly, the PVOH/PVAm may be represented by the following general formula I:

$$\text{---(CH}_2\text{---CH)}_m\text{---(CH}_2\text{---CH)}_n\text{---(CH}_2\text{---CH)}_x\text{---(CH}_2\text{---CH)}_y\text{---}$$
$$\begin{array}{cccc} | & | & | & | \\ O & O & NH & NH_2 \\ | & | & | \\ C=O & H & C=O \\ | & & | \\ CH_3 & & H \end{array}$$

where
 m: = 0–15 mole %
 n = 50–99 mole %
 x = 0–30 mole %, preferably 0.5–10 mole % and
 y = 0.1–50 mole %, preferably 1–25 mole %;
preferably
 m = 0–2 mole %,
 n = 70–95 mole %
 x = 0.5–10 mole %, and
 y = 1–25 mole %.
most preferably
 m = 0–2 mole %
 n = 85–95 mole %
 x = 0.5–4 mole %; and
 y = 5–12 mole %

Although the lower limit of "m" and "x" in the above formula I is stated, for convenience, as zero, in all likelihood, the lower limit may be a fractional number slightly greater than zero due to the physical "impossibility" of hydrolyzing every single acetate and formamide functionality in the polymers.

The weight-average molecular weight (Mw) of the PVOH/PVAm's would range from 10,000 to 200,000, preferably 30,000 to 50,000.

U.S. Pat. No. 4,774,285 and EP 0,339,371 A2 teach the preparation of suitable PVOH/PVAm's for use in the present invention.

The amount of the PVOH/PVAm used in the stabilizing composition for the aqueous emulsion polymerization of monomers is that amount which is sufficient to effect stabilization of the resulting polymer in the continuous aqueous phase. Such amount may suitably range from 0.5 to 20 wt %, based on total monomers, preferably 2 to 8 wt %, and most desirably 2 to 5 wt %.

Although partially or fully hydrolyzed PVOH/PVAm may be used, it is preferred to use the fully hydrolyzed (98+mole %) copolymers, i.e., both the VAc and NVF functionalities are ≧98 mole % hydrolyzed. The copolymers are water soluble and impart advantageous properties to the emulsion polymer products prepared in their presence.

Suitable ethylenically unsaturated polymerizable monomers useful in the preparation of the aqueous polymer emulsions according to the invention would comprise monoolefinically and polyolefinically unsaturated monomers, including $C_3$-$C_{10}$ alkenoic acids, such as acrylic, methacrylic, crotonic and isocrotonic acids, and their esters with $C_1$-$C_{18}$ alkanols, such as methanol, ethanol propanol butanol and 2-ethylhexyl alcohol; $\alpha,\beta$-unsaturated $C_4$-$C_{10}$ alkenedioic acids, such as maleic acid, fumaric acid and iraconic acid, and their monoesters and diesters with the same $C_1$-$C_{18}$ alkanols; vinyl halides such as vinyl chloride and vinyl fluoride; vinylidene halides, such as vinylidene chloride; alkenes, such as ethylene, propylene and butadiene; styrene, vinyl toluene and other substituted styrenes; and nitrogen containing monoolefinically unsaturated monomers, particularly nitriles, amides, N-methylolamides, lower alkanoic acid esters of N-methylolamides, lower alkyl ethers of N-methylolamides and allyl carbamates, such as acrylonitrile, acrylamide, methacrylamide, N-methylolacrylamide, N-methylolmethacrylamide, N-methylolallyl carbamate and N-methylol lower alkyl ethers and N-methylol lower alkanoic acid esters of acrylamide, methacrylamide and allyl carbamate; vinyl esters of $C_1$-$C_{18}$ alkanoic acids, such as vinyl formate, vinyl propionate, vinyl laurate and especially vinyl acetate; vinyl ethers, such as methyl vinyl ether and isobutyl vinyl ether; and vinylamides, such as N-vinyl pyrrolidone, N-vinylacetamide, and N-vinylformamide.

Each of the above monomers may be homopolymerized or copolymerized with at least one other comonomer by aqueous emulsion polymerization techniques well known in the art using the stabilizing composition of the present invention. Such polymerization techniques are described in such chemistry texts as Polymer Synthesis, Vol. I and II, by S. R. Sandler and W. Karo, Academic Press, New York and London (1974), and Preparative Methods of Polymer Chemistry, Second Edition, by W. R. Sorenson and T. W. Campbell, Interscience Publishers (John Wiley & Sons), New York (1968) as well as numerous patent documents.

Polymers and copolymers can be prepared by any of the known emulsion polymerization processes, such as batch, semi-batch and continuous polymerization processes. The monomers in the aqueous emulsion polymerization recipe can be added all at once or metered into the polymerization reaction medium incrementally in an intermittent or continuous, preferably uniform, addition rate or at any combination thereof in order to take advantage of the various polymerization reactivities of the various monomers. Aqueous polymer emulsions containing 20 to 65 wt % solids may be obtained.

Catalytically effective amount of various free-radical forming materials can be used in carrying out the polymerization of the monomers, such as peroxide compounds, like peracetic acid, benzoyl peroxide and t-butyl hydroperoxide, persulfate salts like potassium persulfate and azo compounds like 2,2'-azobisamidinopropane hydrochloride. Combination-type systems employing both reducing agents and oxidizing agents can also be used, i.e., a redox system, such as t-butyl hydroperoxide and sodium formaldehyde sulfoxylate.

The oxidizing agent is generally employed in an amount of 0.01 to 1%, preferably 0.05 to 0.5%, based on weight of the monomers introduced into the polymerization system. The reducing agent is ordinarily added in an aqueous solution in the necessary equivalent amount.

With regard to aqueous emulsion polymerization techniques, again any of the well-known emulsifying agents can be used in addition to the PVOH/PVAm, such emulsifying agents include ionic and nonionic surfactants, such as sodium lauryl sulfate, sodium sulfosuccinate esters and amides, sulfonated alkyl benzenes, alkylphenoxy poly(ethyleneoxy) ethanols and other poly(ethyleneoxy) condensates.

The concentration range of the total amount of emulsifying agents useful is from less than 0.5 to 10% based on total monomers.

In addition to or in place of the surfactants, protective colloids, such as PVOH and celluloses, like hydroxyethyl cellulose, methyl cellulose, hydroxypropylmethyl cellulose and the like, can be used in combination with the PVOH/PVAm in the stabilizing composition.

In a preferred embodiment of the invention, vinyl acetate homo- and copolymers and copolymers of vinyl acetate and ethylene [VAE] are prepared in the presence of PVOH/PVAm. Such VAE copolymers are composed of 60 to 100 wt % vinyl acetate and 0 to 40 wt % ethylene, preferably 70 to 90 wt % vinyl acetate and 10 to 30 wt % ethylene. Other comonomers can also be incorporated into the vinyl acetate polymers such as higher vinyl esters, acrylates, carboxylic acid comonomers and acrylamides in amounts ranging from 1 to 10 wt %, preferably 2 to 5 wt %.

One unique property of these vinyl acetate polymer emulsions is their ability to enhance the adhesion to wood and other cellulosic substrates even without the incorporation of additional crosslinking functionalities. It is believed that the cellulose which contains free hydroxyl functionalities may be reactive toward the amine functionalities present in the stabilizing PVOH/PVAm leading to enhancements in wood adhesion.

In addition, the emulsion products stabilized with the PVOH/PVAm allow crosslinking by addition of appropriate chemical functionalities, including methyl vinyl ether/maleic anhydride copolymers as a crosslinker. These crosslinkers have dramatic effects on the ultimate water sensitivity of the final emulsion products. Other crosslinkers containing functionality such as isocyanates are also possible.

In yet another embodiment of the invention, (meth)acrylic ester homopolymers and copolymers of the (meth)acrylic esters with each other and/or other acrylic monomers are prepared using the PVOH/PVAm stabilizing agent. The copolymers are composed of (meth)acrylic monomers such as $C_1$–$C_{18}$ alkyl (meth)acrylates, (meth)acrylic acid and similar monomers.

Not only does the presence of a small amount of amine functionality in the PVOH allow easier incorporation into the acrylic emulsion but it also allows for other advantages such as crosslinking through the addition of anhydride functional polymers, in addition to the advantages delineated in the prior art regarding cationic latexes. In effect, minor modifications of acrylic emulsion products through the incorporation of only a small amount of amine functionality has allowed for relatively large property modifications to be observed.

Other preferred polymer systems that may be prepared using the PVOH/PVAm stabilizing agent include vinyl/acrylic copolymers, styrene polymers, styrene/butadiene copolymers, vinyl/acrylic/styrene copolymers, ethylene/vinyl chloride copolymers, vinyl acetate/ethylene/vinyl chloride copolymers and the like.

EXAMPLE 1

This example is a control PVOH stabilized emulsion polymer used later as a comparative example in property differentiation between an all PVOH stabilized polymer composition and polymer compositions containing PVOH/PVAm in the stabilizing composition.

An initial charge of 13.2 g of Airvol ®-523 PVOH 10% aqueous solution, 40.5 g of deionized water and 0.04 g of ferrous sulfate ($FeSO_4$) were added to a 500 ml resin kettle equipped with a mechanical stirrer, condenser, thermometer and addition ports for nitrogen and delay feeds. Surfynol ® PC surfactant, 2 drops, was added to this solution as a defoamer. Also added was 2.0 g of a 3% (w/w) $H_2O_2$ solution. Vinyl acetate monomer, 26.4 g, was then added with rapid agitation to create a monomer emulsion. This premix was then purged with nitrogen for 15 minutes. The premix was heated to a temperature of 70° C. and a delay feed of 4% (w/w) sodium formaldehyde sulfoxylate (SFS) was begun at a rate of 6.5 cc/hr. The reaction temperature increased to 80° C. The vinyl acetate monomer delay and the stabilizer/$H_2O_2$ delays were then started. The vinyl acetate delay consisted of 176 g of vinyl acetate and 0.9 g of Surfynol PC surfactant. The stabilizer delay consisted of 106 g of Airvol 523 PVOH solution (10% w/w), 28 g of deionized water, 10 g of 3% (w/w) $H_2O_2$ solution and 0.35 g of sodium bicarbonate ($NaHCO_3$). Both delays were pumped into the reactor at equal rates which were varied between 0.6–2.5 cc/min in order to control the reaction temperature at 80° C. At the conclusion of the delay additions, the reaction was held at 80° C. for 1 hour; after that time, the free monomer level was measured at 0.3% (w/w) and the reactor was cooled. The reaction components are summarized below.

| Initial Charge | |
|---|---|
| Airvol 523[a], 10% soln | 13.2 g |
| Deionized water | 40.5 g |
| Ferrous sulfate | 0.04 g |
| Surfynol PC | 2 drops |
| $H_2O_2$, 3% solution | 2.0 g |
| Vinyl acetate monomer | 26.4 g |
| Delay feeds | |
| Airvol 523, 10% solution | 106 g |
| Deionized water | 28 g |
| $H_2O_2$, 3% solution | 10 g |
| $NaHCO_3$ | 0.35 g |
| SFS, 4% solution | 25 g |
| Viny acetate monomer | 176 g |
| Surfynol PC | 0.9 g |

[a] PVOH - 87–89 mole % hydrolyzed; Mw of 85,000–146,000

EXAMPLE 2

This example is prepared using a combination of Airvol 523 PVOH and a PVOH/PVAm copolymer as the stabilizing composition.

An initial charge consisting of 25 g of Airvol 523 PVOH (10% w/w) solution, 25 g deionized water, 0.08 g ferrous sulfate, 2 drops of Surfynol PC surfactant, 2 g of $H_2O_2$ (3% w/w) solution and 50 g of vinyl acetate monomer were added to a 500 ml resin kettle and rapidly stirred to emulsify. This premix was then purged for 15 minutes with nitrogen and heated to 70° C. by means of an external oil bath. When the desired temperature was reached, a delay feed of SFS (4% solution) was started at a rate of 6.5 cc/hr. When the reaction exotherm had increased the reaction temperature to 80° C., the remaining delays of monomer and stabilizer solution were begun. The monomer feed consisted of 150 g of vinyl acetate with 0.7 g of Surfynol PC surfactant. The stabilizer delay solution consisted of 150 g of a PVOH/PVAm 5% aqueous solution containing 8.8 g of a 3% w/w $H_2O_2$ solution. The pH of this PVOH/PVAm stabilizer solution was adjusted to 3.5 with hydrochloric acid prior to addition to the reaction. Sodium bicarbonate (0.4 g) was also added to stabilize the pH. The delay feeds of the monomer and stabilizer solutions were added at the same rates and the rates were adjusted to maintain the desired reaction temperature as in Example 1. When the reaction was complete, the free monomer level was measured at 0.3% w/w. Reaction components are summarized below.

| Initial charge | |
|---|---|
| Airvol 523, 10% soln | 25 g |
| Deionized water | 25 g |
| Ferrous sulfate | 0.08 g |
| Surfynol PC | 2 drops |
| $H_2O_2$, 3% solution | 2.0 g |
| Vinyl acetate monomer | 50 g |
| Delay feeds | |
| PVOH/PVAm[a] 5% solution | 150 g |
| $H_2O_2$, 3% solution | 8.8 g |
| $NaHCO_3$ | 0.40 g |
| SFS, 4% solution | 25 g |
| Viny acetate monomer | 150 g |
| Surfynol PC | 0.7 g |

[a] 87.6 mole % PVOH; Mw = 169,000
4.3 mole % PNVF
8.1 mole % PVAm

EXAMPLE 3

This example used the same procedure and amounts as Example 2 but substituted Airvol 205 PVOH for Airvol 523 PVOH. Airvol 205 PVOH is 87–89 mole % hydrolyzed and has a Mw of 31,000–50,000.

EXAMPLE 4

This example used no PVOH in the stabilization system. The entire stabilizing polymer was based on PVOH/PVAm copolymer comprising 6% mole amine.

An initial charge consisting of 50 g of a PVOH/PVAm copolymer 5% aqueous solution, 0.04 g ferrous sulfate, 2 g $H_2O_2$ solution (3% w/w) and 1 drop of Surfynol PC surfactant were added to a 500 ml resin kettle. Adjustment of the pH of this solution was conducted with hydrochloric acid to a pH of 3.0. Vinyl acetate monomer, 50 g, was then added with vigorous stirring and the premix purged with nitrogen for 15 minutes. The reaction was then heated to 70° C. and a delay feed of SFS 4% solution was begun at a rate of 6.5 cc/hr. When the reaction temperature increased to 80° C., the remaining delay feeds of monomer and stabilizer solution were begun. The monomer delay consisted of 160 g of vinyl acetate monomer and 0.7 g of Surfynol PC surfactant. The stabilizer delay solution consisted of 150 g of a 5% w/w aqueous solution of another PVOH/PVAm copolymer and 10 g of a $H_2O_2$ solution (3% w/w). Once again, the addition rates were equal and were varied to control the reaction at the desired temperature. At the completion of the reaction, the free monomer was measured at 0.5% w/w.

| Initial charge | |
|---|---|
| PVOH/PVAm[a] 5% solution | 50 g |
| Ferrous sulfate | 0.04 g |
| Surfynol PC | 1 drop |
| $H_2O_2$, 3% solution | 2.0 g |
| Vinyl acetate monomer | 50 g |
| Delay feeds | |
| PVOH/PVAm[b] 5% solution | 150 g |
| $H_2O_2$, 3% solution | 10.0 g |
| $NaHCO_3$ | 0.40 g |
| SFS, 4% solution | 25 g |
| Vinyl acetate monomer | 160 g |
| Surfynol PC | 0.7 g |

[a] 93 mole % PVOH; Mw = 36,000
7 mole % PVAm
[b] 96.3 mole % PVOH; Mw = 88,200
2.1 mole % PNVF
1.6 mole % PVAm

EXAMPLE 5

In this reaction, the same components were used as in Example 4, but the relative quantities were adjusted to achieve a 55% solids final product.

Same process as in Example 4 was used, but with the following amounts of material:

| Initial charge | |
|---|---|
| PVOH/PVAm[a] 5 % solution | 45 g |
| Ferrous sulfate | 0.04 g |
| Surfynol PC | 1 drop |
| $H_2O_2$, 3% solution | 2.0 g |
| Vinyl acetate monomer | 55 g |
| Delay feeds | |
| PVOH/PVAm[b] 5% solution | 135 g |
| $H_2O_2$, 3% solution | 10.0 g |
| $NaHCO_3$ | 0.40 g |
| SFS, 4% solution | 25 g |
| Vinyl acetate monomer | 190 g |

| | |
|---|---|
| Surfynol PC | 0.85 g |

[a] 93 mole % PVOH; Mw = 36,000
7 mole % PVAm
[b] 96.3 mole % PVOH; Mw = 88,200
2.1 mole % PNVF
1.6 mole % PVAm

EXAMPLE 6

The resulting product from Example 5 was pH adjusted with aqueous NaOH solution to pH 4.5 from pH 2.5.

EXAMPLE 7

A comparative example which is Vinac® XX-210 emulsion: a completely PVOH stabilized PVAc emulsion. The PVOH stabilizing composition comprises Airvol 205 PVOH and Airvol 540 PVOH, the latter being 87–89 mole % hydrolyzed and having a Mw of 124,000–186,000.

EXAMPLE 8

A comparative example consisting of the plant sample of Vinac XX-210 emulsion diluted to 42% solids to make it comparable to Examples 1-4 above.

EXAMPLE 9

This example consists essentially of the same composition as Example 5 with the following amounts of materials. The process used in the reaction is that for Example 5.

| | |
|---|---|
| Initial charge | |
| PVOH/PVAm[a] 5% solution | 50 g |
| Ferrous sulfate | 0.05 g |
| Surfynol PC | 1 drop |
| H$_2$O$_2$, 3% solution | 10 g |
| Vinyl acetate monomer | 65 g |
| Delay feeds | |
| PVOH/PVAm[a] 5% solution | 150 g |
| H$_2$O$_2$, 50% solution | 0.6 g |
| NaHCO$_3$ | 0.40 g |
| SFS, 4% solution | 25 g |
| Vinyl acetate monomer | 196 g |
| Surfynol PC | 0.78 g |

[a] 93 mole % PVOH; Mw of 36,000
7 mole % PVAm

EXAMPLE 10

This example also uses the same process as Example 5 with the following quantities of components:

| | |
|---|---|
| Initial charge | |
| PVOH/PVAm[a] 5% solution | 44 g |
| Ferrous sulfate | 0.05 g |
| Surfynol PC | 1 drop |
| H$_2$O$_2$, 3% solution | 10 g |
| Vinyl acetate monomer | 65 g |
| Delay feeds | |
| PVOH/PVAm[a] 5% solution | 106 g |
| H$_2$O$_2$, 3% solution | 15 g |
| NaHCO$_3$ | 0.40 g |
| SFS, 4% solution | 25 g |
| Vinyl acetate monomer | 155 g |
| Surfynol PC | 0.5 g |

[a] 93 mole % PVOH; Mw of 36,000
7 mole % PVAm

EXAMPLE 11

This reaction was a duplicate of Example 10.

EXAMPLE 12

This example is a totally PVOH stabilized product using two different molecular weight PVOHs. The process used for the polymerization is the same as described in Example 1 with the following components:

| | |
|---|---|
| Initial charge | |
| Airvol 523, 10% soln | 22.75 g |
| Deionized water | 22.25 g |
| Ferrous sulfate | 0.05 g |
| Surfynol PC | 1 drop |
| H$_2$O$_2$, 3% solution | 10 g |
| Vinyl acetate monomer | 65 g |
| Delay feeds | |
| Airvol 205, 10% solution | 54.25 g |
| Deionized water | 30.75 g |
| H$_2$O$_2$, 3% solution | 15 g |
| NaHCO$_3$ | 0.35 g |
| SFS, 4% solution | 25 g |
| Vinyl acetate monomer | 155 g |
| Surfynol PC | 0.5 g |

A table of the aqueous polymer emulsion compositions of Examples 1-12 and their properties is given in Table 1.

TABLE 1

| Ex. | % Solids | AV-205 PVOH LMw | AV-523 PVOH MMw | PVOH/PVAm MMw | PVOH/PVAm LMw | PVOH/PVAm MMw | PVOH/PVAm LMw | Visc.* cps | Accel sed % |
|---|---|---|---|---|---|---|---|---|---|
| 1 | 46 | 0 | 100 | 0 | 0 | 0 | 0 | 2,200 | — |
| 2 | 40 | 0 | 25 | 75 | 0 | 0 | 0 | 6,000 | 4.5 |
| 3 | 43 | 25 | 0 | 75 | 0 | 0 | 0 | 1,600 | 3.0 |
| 4 | 43 | 0 | 0 | 0 | 0 | 75 | 25 | 600 | 3.0 |
| 5 | 55 | 0 | 0 | 0 | 0 | 75 | 25 | 7,500 | 7.5 |
| 6 | | | Example 5 pH adjustsd to 4.3 | | | | | | |
| 7 | 55 | | Combination of AV-205/AV-540 | | | XX-210 | | 1,360 | 4.0 |
| 8 | | | Example 7 Diluted to 42% solids | | | | | | |
| 9 | 53 | 0 | 0 | 0 | 0 | 0 | 100 | 1,500 | 4.0 |
| 10 | 55 | 0 | 0 | 0 | 0 | 0 | 100 | 460 | 3.0 |
| 11 | 56 | 0 | 0 | 0 | 0 | 0 | 100 | 1,060 | 1.0 |
| 12 | 55 | 70 | 30 | 0 | 0 | 0 | 0 | 450 | 1.0 |

*#3 spindle @ 60 rpm.
LMw = low molecular weight
MMw = medium molecular weight
Stabilizer values represent percentages of total stabilizer. Total stabilizer content is ~3.4% based on polymer weight dry on dry.

Examples 13-18 represent adhesive property data which clearly show the advantages of the vinyl amine presence in the stabilizing copolymer. The examples refer to the synthesis examples previously mentioned.

EXAMPLE 13

Examples 1-8 were evaluated as single lap shear adhesive joints employing maplewood adherends in a test procedure similar to ASTM D 1002. 4"×0.75"×0.1875"(10.2×1.9×0.48 cm) maplewood adherends were bonded in a lap shear geometry with an overlap bonded area of 0.5625 in²; 0.75"×0.75"(3.63 cm²; 1.9×1.9 cm). A medium sized binder clip was used to hold the adhesive bond until drying was completed. The joint pressure supplied by the binder clip was estimated to be 65 psi (0.45 MPa). The prepared bonds were dried at 22° C. and 54% relative humidity (RH) for 24 hours. The binder clips were removed from the bond site and the lap shear strength of the joint was determined on an Instron 1011 under tension at a crosshead speed of 0.10"/min. (0.25 cm/min). Table 2 summarizes the lap shear strength data and notes the number of wood failures observed. The data of Table 2 reflects the results obtained when the mode of failure at the bond site was qualitatively cohesive in nature. Standard deviation of replicate samples were all within 10% of the mean.

TABLE 2

| Example | Lap Shear Strength (psi) | (MPa) | # of Wood Failures |
|---|---|---|---|
| 1 | 1408 | 9.71 | 1 out of 4 |
| 2 | 1233 | 8.50 | 1 out of 4 |
| 3 | 1322 | 9.11 | 2 out of 4 |
| 4 | 1103 | 7.61 | 1 out of 4 |
| 5 | 1190 | 8.21 | 0 out of 4 |
| 6 | 1067 | 7.36 | 0 out of 4 |
| 7 | 949 | 6.54 | 0 out of 4 |
| 8 | 982 | 6.77 | 0 out of 4 |

EXAMPLE 14

Example 13 was repeated, except that the prepared bonds were dried at 70° C. in an air circulating oven for 19 hours followed by conditioning at 22° C. and 54% relative humidity (RH) for 5 hours. Table 3 summarizes the lap shear strength data and notes the number of wood failures observed. The data of Table 3 reflects the result obtained when the mode of failure at the bond site was qualitatively cohesive in nature.

TABLE 3

| Example | Lap Shear Strength (psi) | (MPa) | # of Wood Failures |
|---|---|---|---|
| 1 | 1627 | 11.22 | 1 out of 4 |
| 2 | 1479 | 10.20 | 0 out of 4 |
| 3 | 1758 | 12.12 | 4 out of 8 |
| 4 | 1423 | 9.81 | 4 out of 8 |
| 5 | 1506 | 10.38 | 4 out of 8 |
| 6 | 1615 | 11.13 | 4 out of 8 |
| 7 | 1292 | 8.91 | 1 out of 4 |
| 8 | 1210 | 8.34 | 1 out of 4 |

EXAMPLE 15

Example 13 was repeated, except that the prepared bonds were dried at 100° C. in an air circulating oven for 19 hours followed by conditioning at 22° C. and 54% relative humidity (RH) for 5 hours. Table 4 summarizes the lap shear strength data and notes the number of wood failures observed. The data of Table 4 reflects the results obtained when the mode of failure at the bond site was qualitatively cohesive in nature.

TABLE 4

| Example | Lap Shear Strength (psi) | (MPa) | # of Wood Failures |
|---|---|---|---|
| 1 | 1360 | 9.38 | 1 out of 4 |
| 2 | 1308 | 9.02 | 1 out of 4 |
| 3 | 1361 | 9.38 | 1 out of 4 |
| 4 | 1303 | 8.98 | 1 out of 4 |
| 5 | 1686 | 11.62 | 0 out of 5 |
| 6 | 1528 | 10.54 | 1 out of 5 |
| 7 | 1272 | 8.77 | 1 out of 5 |
| 8 | 1220 | 8.41 | 0 out of 4 |

EXAMPLE 16

Lap shear adhesive joints prepared as outlined in Example 13 were submerged in 22° C. water for 4 hours. The lap shear strength data was determined on soaked bonds and the ratio of wet to dry lap shear strength was determined as summarized in Table 5.

TABLE 5

| EXAMPLE | LAP SHEAR STRENGTH WET BOND (psi) | (MPa) | % RETENTION OF DRY BOND STRENGTH |
|---|---|---|---|
| 1 | 0 | 0 | 0 |
| 2 | 505 | 3.48 | 41 |
| 3 | 436 | 3.01 | 33 |
| 4 | 713 | 4.92 | 65 |
| 5 | 784 | 5.41 | 66 |
| 6 | 501 | 3.45 | 47 |
| 7 | 471 | 3.25 | 50 |
| 8 | 0 | 0 | 0 |

EXAMPLE 17

Lap shear adhesive joints prepared as outlined in Example 14 were submerged in 22° C. water for 4 hours. The lap shear strength data was determined on soaked bonds and the ratio of wet to dry lap shear strength was determined as summarized in Table 6.

TABLE 6

| EXAMPLE | LAP SHEAR STRENGTH WET BOND (psi) | (MPa) | % RETENTION OF DRY BOND STRENGTH |
|---|---|---|---|
| 1 | 183 | 1.26 | 11 |
| 2 | 341 | 2.35 | 23 |
| 3 | 569 | 3.92 | 32 |
| 4 | 800 | 5.52 | 56 |
| 5 | 891 | 6.14 | 59 |
| 6 | 1083 | 7.47 | 67 |
| 7 | 457 | 3.15 | 35 |
| 8 | 382 | 2.63 | 32 |

EXAMPLE 18

Lap shear adhesive joints prepared as outlined in Example 15 were submerged in 22° C. water for 4 hours. The lap shear strength data was determined on soaked bonds and the ratio of wet to dry lap shear strength was determined as summarized in Table 7.

TABLE 7

| EXAMPLE | LAP SHEAR STRENGTH WET BOND (psi) | (MPa) | % RETENTION OF DRY BOND STRENGTH |
|---|---|---|---|
| 1 | 0 | 0 | 0 |
| 2 | 372 | 2.56 | 28 |
| 3 | 581 | 4.01 | 43 |

TABLE 7-continued

| EX-AMPLE | LAP SHEAR STRENGTH WET BOND (psi) | (MPa) | % RETENTION OF DRY BOND STRENGTH |
|---|---|---|---|
| 4 | 356 | 2.46 | 27 |
| 5 | 1124 | 7.75 | 67 |
| 6 | 899 | 6.20 | 59 |
| 7 | 287 | 1.98 | 23 |
| 8 | 146 | 1.01 | 12 |

EXAMPLE 19

Various amounts of an aqueous solution (10% by weight) of vinyl methyl ether/maleic anhydride (50/50 molar ratio) copolymer were added and mixed into Examples 9, 10 and 11. After 45 minutes, an equilibrium viscosity was achieved and single lap shear adhesive joints were prepared employing maplewood adherends in a test procedure similar to ASTM D 1002. Maplewood adherends 4"×0.75"×0.1875" (10.2×1.9×0.48 cm) were bonded in a lap shear geometry with an overlap bonded area of 0.5625 in²; 0.75"×0.75" (3.63 cm²; 1.9×1.9 cm). A medium sized binder clip was employed to hold the adhesive bond until drying was completed. The joint pressure supplied by the binder clip was estimated to be 65 psi (0.45 MPa). The prepared bonds were dried in an air circulating oven at 70° C. for 17 hours. Following this drying period, the binder clips were removed from the joint and the bonds were subjected to one of the following three exposures prior to testing:

CONDITION 1: 25° C. air temperature at 50% relative humidity for 4 hr.
CONDITION 2: Soaked in 25° C. water for 4 hr.
CONDITION 3: Soaked in boiling water for 4 hr followed by soaking in 25° C. water for 45 min.

Immediately following the exposure period, the lap shear strength of the joint was determined on an Instron 1011 under tension at a crosshead speed of 0.1"/min (0.254 cm/min). Table 8 summarizes the lap shear strength data for bonds in which the mode of failure at the bond site was judged to be qualitatively cohesive in nature.

TABLE 8

TEST CONDITIONS: T = 22° C.
LAP SHEAR STRENGTH IN PSI (MPa)

| Vinyl Methyl Ether/ Maleic Anhydride Addition (grams of 10% aqueous solution per 15 grams of Examples 9, 10, 11) | CONDITION 1 | CONDITION 2 | CONDITION 3 |
|---|---|---|---|
| 0 | 1493 (10.30) | 486 (3.35) | 0 |
| 0.1481 | 1423 (9.81) | 599 (4.13) | 0 |
| 0.3050 | 1510 (10.41) | 1080 (7.45) | 0 |

EXAMPLE 20

Cast films were prepared from poly(vinyl acetate) homopolymer emulsions containing either PVOH as the only stabilizer or a combination of PVOH and PVOH/PVAm as the stabilizer. The actual emulsion used was Example 2. Both samples were pH adjusted to 10 with sodium hydroxide and a 10% solution of vinyl methyl ether/maleic anhydride copolymer (VME/MAn) was added to provide 0.6% w/w dry on dry of the VME/MAn to the polymer solids of the emulsions. The films were then dried at room temperature. When dried, the films were immersed into room temperature tap water. The sample containing PVOH as the only stabilizer disintegrated with 5 minutes after shaking. The sample containing the PVOH/PVAm stabilizer remained intact indefinitely. This example illustrates the dramatic property differences imparted by the addition of small amounts of primary amine functionality and appropriate crosslinkers.

EXAMPLE 21

This example demonstrates the use of PVOH/PNVF as a stabilizer for vinyl acetate/ethylene emulsion copolymers.

| Initial Charge | |
|---|---|
| PVOH/PNVF[a] 10% solution | 466 g |
| Deionized water | 680 g |
| Igepal Co-887 | 44.4 g |
| Ferrous ammonium sulfate (1% solution) | 4.8 g |
| Tartaric acid | 1.94 g |
| Vinyl acetate monomer | 1555 g |
| Ethylene | 420 g |
| Delay Feeds | |
| H₂O₂, 0.6% solution | 2 ml |
| H₂O₂, 1.0% solution | 80 ml |
| H₂O₂, 5.0% solution | 68.4 ml |
| SFS, 8% solution | 116.5 ml |
| Ethylene | 50 g |

[a] 91 mole % PVOH; Mw of 164,000
9 mole % PNVF
<1 mole % PVAm (estimated)

The polymerization process was conducted as follows. First, the pH of the PVOH/PNVF copolymer solution containing the Igepal surfactant and water was adjusted to 4 using tartaric acid. The ferrous ammonium sulfate solution was then added and the premix was then charged to a one gallon reactor. The solution was stirred and the vinyl acetate charge was added. This mixture was purged to 30 psig (2 atm) twice with nitrogen and once with ethylene. After equilibration for 30 minutes, the system was pressurized with 420 grams of ethylene at a temperature of 30° C. and allowed to equilibrate. The reaction was then initiated by the simultaneous addition of the 0.6% hydrogen peroxide solution and the reducing agent (either 8.0% SFS solution or 6.5% sodium erythorbate/erythorbic acid [SE/EA]) at 0.4 ml/min and 0.6 ml/min, respectively. When initiation was observed by a rise in temperature, the initiator was changed to the 1.0% hydrogen peroxide solution and the reaction temperature was ramped to 60° C. At this temperature, 50 g of additional ethylene were added and the initiator rate was controlled to maintain the desired reaction temperature. When the free monomer was measured as less than 3.0% w/w, the initiator solution was changed to the 5.0% hydrogen peroxide solution, increasing from 0.5 to 1.0 ml/min over a period of 5-10 minutes. At this time, the free monomer was measured at less than 0.6% and the reaction was cooled to 30° C. and adjusted to pH 4.5 through the addition of 7.0% ammonium hydroxide solution. Next, the reaction mixture was transferred to a degasser to vent excess ethylene and Colloid 585 defoamer (0.5 g) added along with the following dissolved in 20 g of water: 1.5 g of t-butyl hydroperoxide and 0.8 g of sodium citrate.

The product exhibited the following properties:

| % Solids Viscosity (cps) | 58.2 |
|---|---|
| 60 RPM | 3885 |
| 20 RPM | 5210 |
| 12 RPM | 7650 |

EXAMPLE 22

This example demonstrates the use of PVOH/PNVF in combination with PVOH as a stabilizer for vinyl acetate/ethylene emulsion copolymers.

| Inital Charge | |
|---|---|
| A-203 PVOH | 233 g |
| PVOH/PNVF[a] 10% solution | 233 g |
| Deionized water | 530 g |
| Igepal CO-887 | 44.4 g |
| Ferrous ammonium sulfate (1% solution) | 4.8 g |
| Tartaric acid | 3.27 g |
| Vinyl acetate monomer | 1555 g |
| Ethylene | 420 g |
| Delay Feeds | |
| $H_2O_2$, 0.6% solution | 7 ml |
| $H_2O_2$, 1.0% solution | 113 ml |
| $H_2O_2$, 5.0% solution | 68.4 ml |
| SFS, 8% solution | 116.5 ml |
| Ethylene | 50 g |

[a]91 mole % PVOH; Mw of 164,000
9 mole % PNVF
<1 mole % PVAm (estimated)

The process was the same as Examples 21 and the product had the following properties:

| % Solids Viscosity (cps) | 60.8 |
|---|---|
| 60 RPM | 4525 |
| 20 RPM | 6230 |
| 12 RPM | 9650 |

EXAMPLE 23

This example demonstrates the use of PVOH/PVAm in combination with PVOH as a stabilizer for vinyl acetate/ethylene emulsion copolymers.

| Initial Charge | |
|---|---|
| A-203 PVOH | 233 g |
| PVOH/PVAm[a] 10% solution | 233 g |
| Deionized water | 500 g |
| Igepal CO-887 | 44.4 g |
| Ferrous ammonium sulfate (1% solution) | 4.8 g |
| Tartaric acid | 4.19 g |
| Vinyl acetate monomer | 1555 g |
| Ethylene | 420 g |
| Delay Feeds | |
| $H_2O_2$, 0.6% solution | 9 ml |
| $H_2O_2$, 1.0% solution | 109 ml |
| $H_2O_2$, 5.0% solution | 68.4 ml |
| SE/EA, 6.5% solution | 116.5 ml |
| Ethylene | 50 g |

[a]91 mole % PVOH; Mw of 164,000
3.5 mole % PNVF
5.5 mole % PVAm

The process was the same as Examples 21 and 22 and the product had the following properties:

| % Solids Viscosity (cps) | 61.1 |
|---|---|
| 60 RPM | 360 |
| 20 RPM | 369 |
| 12 RPM | 415 |

EXAMPLE 24

To a 200 ml reaction vessel equipped with a nitrogen inlet condenser and agitator were charged: 60 g of a 5% aqueous solution of PVOH/PVAm (93 mole %/7 mole %) and having average molecular weight of 36,000 adjusted to pH 5.0 with HCl, 0.05 g of $FeSO_4$, 0.67 g of Surfynol ® PC surfactant and 10 g of 10% (w/w) aqueous solution of $H_2O_2$. Next, 67 g of methyl acrylate was added to this solution and emulsified at 500 rpm agitation rate. The resulting pre-emulsion was purged with nitrogen and heated to 70° C. with an external oil bath. When the temperature had reached the desired value, a delay feed of a 10% (w/w) solution of sodium bisulfite was begun at a rate of 1.5 ml/hr. After 3.5 hours, 1.0 g of ammonium persulfate was added and an exothermic reaction was noted. When the monomer reflux at approximately 80° C. had subsided, the reaction was complete and the product was cooled to room temperature. The resulting emulsion was stable and films prepared from this product were transparent and exhibited excellent toughness and flexibility.

The solid film exhibited a glass transition temperature of 23° C. as measured by the maximum in the loss tangent of a dynamic mechanical experiment conducted at a frequency of 1 Hz.

EXAMPLE 25

To a similar reactor as in Example 24 were charged: 41 g of a 10% (w/w) aqueous solution of a PVOH/PVAm (93 mole %/7 mole %) and having average molecular weight of 36,000 adjusted to pH 4.0 with HCl, 50 g $H_2O$, 0.05 g of sodium bicarbonate, 4.0 g of Triton ® X-100 surfactant, 0.05 g of ferrous sulfate and 0.5 g of ammonium persulfate. To this solution was added 92 g of methyl acrylate. The pre-emulsion was formed by agitation at 500 rpm and the mixture was purged with nitrogen. The reaction was initiated by adding 1.0 g of a 5% (w/w) aqueous solution of sodium bisulfite followed by continuous addition of this solution at a rate of 5.9 ml/hr. A rapid temperature increase occurred and the reaction was quickly completed. A significant amount of coagulum was formed but the separated fluid phase was stable and had a solids content of 50% (w/w).

EXAMPLE 26

To a similar reactor as in Example 24 were charged: 20.52 g of 10% (w/w) aqueous solution of a PVOH/PVAm (93 mole %/7 mole %) and having average molecular weight of 36,000 adjusted to pH 3.1 with HCl, 50 g $H_2O$, 0.01 g of sodium bicarbonate and 0.70 g of Surfynol PC surfactant. Next, 67 g of methyl acrylate was added and dispersed by agitation at 350 rpm. This mixture was then purged with nitrogen and heated to 70° C. The reaction was initiated by the addition of 1% (w/w) ammonium persulfate aqueous solution and the reaction was continued by continuous addition of this solution at a rate of 1 ml/hr. The resulting product had 40% solids and good stability. Films cast from the resulting product were transparent and tough with good flexibility.

The solid film cast from the above product exhibited two maxima in the loss tangent curve as described in Example 24. The first maxima was at 22° C. and is presumably due to the poly(methyl acrylate), while the second maxima occurred at 93° C. and is likely due to the presence of the PVOH/PVAm.

EXAMPLE 27

To approximately 12 g of the product prepared in Example 26 was added about 10 drops of a 1 molar aqueous ammonium hydroxide solution followed by addition of 0.19 g of a 10% aqueous solution of a vinyl methyl/maleic anhydride copolymer (50/50 mole ratio). The film cast from this product again exhibited two maxima in the loss tangent curve at 23° C. and 96° C.

EXAMPLE 28

To 12 g of the product of Example 26 was added about 10 drops of a 1 molar aqueous ammonium hydroxide solution followed by addition of 0.40 g of a 10% aqueous solution of a vinyl methyl ether/maleic anhydride copolymer (50/50 mole ratio). The film cast from this product again exhibited two maxima in the loss tangent curve at 23° C. and 113° C. Presumably, the upper glass transition temperature in these materials is being influenced by the level of addition of the anhydride copolymer indicative of crosslinking. It is especially notable that these marked property changes are observed based on very minor levels of modification of the initial product.

EXAMPLE 29

To a 2000 ml jacketed reactor equipped with a monomer feed line, condenser, agitator and nitrogen inlet was added 414 g of deionized water, 1.5 g of sodium glycolate, 283 g of a 6% aqueous solution of a PVOH/PVAm (93 mole %/7 mole %) and having average molecular weight of 36,000 pH adjusted to 3.5 with acetic acid and 60 g of a 2% aqueous solution of ammonium persulfate. A pre-emulsion consisting of: 494 g of D.I. water, 22.3 g of Harcross-T-DET® 0407 surfactant, 510 g of methyl acrylate, 297.5 g of ethyl acrylate and 42.5 g of methacrylic acid was added to the above solution at a temperature of 75° C. at a rate of 9.2 g/min. for 2.5 hours. The resulting emulsion was measured to contain 31% solids and a film cast from the resulting product exhibited a glass transition temperature of 8° C. by DSC.

EXAMPLE 30

A procedure similar to the one in Example 29 was used, except that instead of 60 g of the 2% aqueous persulfate solution being added to the initial charge, 25 g of that solution was added to the initial charge and the remaining 35 g was added over 2.5 hours at a rate of 0.23 g/min. This product was measured to have a solids content of 35% and exhibited a glass transition temperature of 9° C. by DSC.

EXAMPLE 31

This example demonstrates the use of PVOH/PVAm as a stabilizer for vinyl acetate/ethylene copolymer emulsions.

| Initial Charge | |
| --- | --- |

| -continued | |
| --- | --- |
| PVOH/PVAm[a] 10% solution | 466 g |
| Deionized water | 500 g |
| Igepal CO-887 | 44.4 g |
| Ferrous ammonium sulfate (1% solution) | 4.8 g |
| Tartaric acid | 5.9 g |
| Vinyl acetate monomer | 1555 g |
| Ethylene | 400 g |
| Delay Feeds | |
| $H_2O_2$, 0.6% solution | 7 ml |
| $H_2O_2$, 1.0% solution | 110 ml |
| $H_2O_2$, 5.0% solution | 68 ml |
| SE/EA, 6.5% solution | 116.8 ml |
| Ethylene | 50 g |

[a] 91 mole % PVOH; Mw of 164,000
3.5 mole % PNVF
5.5 mole % PVAm

The process was the same as Examples 21-23 and the product had the following properties. The pH was further adjusted to 6.5 with 1.7 g of 14.5% ammonium hydroxide solution prior to property measurement.

| % Solids Viscosity (cps) | 60.6 |
| --- | --- |
| 60 RPM | 5350 |
| 20 RPM | 7360 |
| 12 RPM | 10,450 |

4 spindle

STATEMENT OF INDUSTRIAL APPLICATION

The present invention provides aqueous polymer emulsions prepared in the presence of PVOH/PVAm as a stabilizing protective colloid.

We claim:

1. In a method for preparing an aqueous polymer emulsion by the free radical aqueous emulsion polymerization of at least one ethyleneically unsaturated monomer in the presence of a stabilizing composition, the improvement which comprises using a stabilizing composition comprising the poly{(vinyl alcohol)-co-(vinyl amine)} copolymer.

2. The method of claim 1 in which the stabilizing composition further contains an emulsifying agent, a protective colloid, or both.

3. The method of claim 1 in which the poly{(vinyl alcohol)-co-(vinyl amine)} copolymer is represented by the formula:

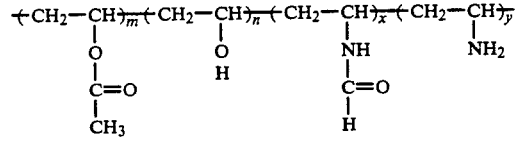

where
m = 0–15 mole %,
n = 50–99 mole %,
x = 0–30 mole %, and
y = 0.1–50 mole %.

4. The method of claim 1 in which the poly{(vinyl alcohol)-co-(vinyl amine)} copolymer has a Mw in the range of 10,000 to 200,000.

5. The method of claim 1 in which the poly{(vinyl alcohol)-co-(vinyl amine)} copolymer has a Mw in the range of 30,000 to 50,000.

6. The method of claim 1 in which the poly{(vinyl alcohol)-co-(vinyl amine)} copolymer is present at 0.5 to 20 wt %, based on total monomers.

7. The method of claim 1 in which the poly{(vinyl alcohol)-co-(vinyl amine)} copolymer is 98+ mole % hydrolyzed.

8. The method of claim 1 in which the aqueous emulsion polymer is a vinyl acetate homopolymer or copolymer, an acrylic ester homopolymer or copolymer, a methacrylic ester homopolymer or copolymer, an acrylic homopolymer or copolymer, a methacrylic homopolymer or copolymer, a styrene polymer, a styrene/butadiene copolymer, a vinyl/acrylic/styrene copolymer, an ethylene/vinyl chloride copolymer, or a vinyl acetate/ethylene/vinyl chloride copolymer.

9. In a method for preparing an aqueous polymer emulsion by the free radical aqueous emulsion polymerization of at least one ethylenically unsaturated monomer in the presence of a stabilizing composition, the improvement which comprises using a stabilizing composition consisting essentially of 0.5-20 wt %, based on total monomers, of a poly{(vinyl alcohol)-co-(vinyl amine)} copolymer and, optionally, an emulsifying agent and/or protective colloid, the poly{(vinyl alcohol)-co-(vinyl amine)} copolymer having the following formula

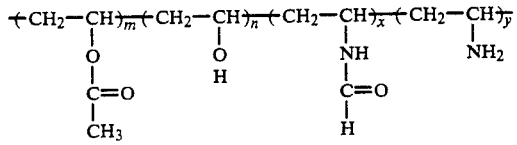

where
m=0-15 mole %,
n=50-99 mole %,
x=0-30 mole %, and
y=0.1-50 mole %;
and a Mw in the range of 10,000 to 200,000.

10. The method of claim 9 in which the aqueous emulsion polymer is a vinyl acetate homopolymer or copolymer, an acrylic ester homopolymer or copolymer, a methacrylic ester homopolymer or copolymer, an acrylic homopolymer or copolymer, a methacrylic homopolymer or copolymer, a styrene polymer, a styrene/butadiene copolymer, a vinyl/acrylic/styrene copolymer, an ethylene/vinyl chloride copolymer, or a vinyl acetate/ethylene/vinyl chloride copolymer.

11. The method of claim 10, in which
m=0-2 mole %,
n=70-95 mole %
x=0.5-10 mole %, and
y=1-25 mole %.

12. The method of claim 11 in which the poly{(vinyl alcohol)-co-(vinyl amine)} copolymer is present at 2-8 wt %, based on total monomers.

13. The method of claim 12 in which the poly{(vinyl alcohol)-co-(vinyl amine)} copolymer is 98+ mole % hydrolyzed.

14. The method of claim 12 in which
m=0-2 mole %,
n=85-95 mole %
x=0.5-4 mole %, and
y=5-12 mole %.

15. The method of claim 1 in which the emulsion polymer is then crosslinked with a crosslinking compound capable of reacting with the amine functionality of the emulsion polymer.

16. The method of claim 8 in which the emulsion polymer is then crosslinked with a crosslinking compound capable of reacting with the amine functionality of the emulsion polymer.

17. The method of claim 9 in which the emulsion polymer is then crosslinked with a crosslinking compound capable of reacting with the amine functionality of the emulsion polymer.

18. The method of claim 10 in which the emulsion polymer is then crosslinked with a crosslinking compound capable of reacting with the amine functionality of the emulsion polymer.

19. The method of claim 12 in which the emulsion polymer is then crosslinked with a crosslinking compound capable of reacting with the amine functionality of the emulsion polymer.

20. In an aqueous polymer emulsion comprising a polymer colloidally suspended in an aqueous medium, the improvement which comprises the polymer emulsion also containing a poly{(vinyl alcohol)-co-(vinyl amine)} copolymer.

21. The polymer emulsion of claim 20 in which the polymer comprises at least one monomer selected from the group consisting of $C_3$-$C_{10}$ alkenoic acids, esters of such alkenoic acids with $C_1$-$C_{18}$ alkanols, $\alpha,\beta$-unsaturated $C_4$-$C_{10}$ alkenedioic acids, and monoesters and diesters of such alkenedioic acids, vinyl halides, vinylidene chloride, alkenes, styrene, vinyl toluene, nitrogen containing monoolefinically unsaturated monomers, vinyl esters of $C_1$-$C_{18}$ alkanoic acids, vinyl ethers and vinylamides.

22. The polymer emulsion of claim 20 in which the polymer is a polyvinyl acetate.

23. The polymer emulsion of claim 20 in which the polymer is a vinyl acetate/ethylene copolymer.

24. The polymer emulsion of claim 20 in which the polymer comprises at least one monomer selected from the group consisting of acrylic acid, methacrylic acid, acrylic esters and methacrylic esters.

25. The polymer emulsion of claim 20 in which the poly{(vinyl alcohol)-co-(vinyl amine)} copolymer is represented by the formula:

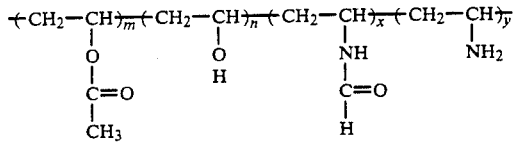

where
m=0-15 mole %,
n=50-99 mole %,
x=0-30 mole %, and
y=0.1-50 mole %;

26. The polymer emulsion of claim 25 in which the polymer comprises at least one monomer selected from the group consisting of $C_3$-$C_{10}$ alkenoic acids, esters of such alkenoic acids with $C_1$-$C_{18}$ alkanols, $\alpha,\beta$-unsaturated $C_4$-$C_{10}$ alkenedioic acids, and monoesters and diesters of such alkenedioic acids, vinyl halides, vinylidene chloride, alkenes, styrene, vinyl toluene, nitrogen containing monoolefinically unsaturated monomers, vinyl esters of $C_1$-$C_{18}$ alkanoic acids, vinyl ethers and vinylamides.

27. The polymer emulsion of claim 25 in which the polymer is a polyvinyl acetate.

28. The polymer emulsion of claim 25 in which the polymer is a vinyl acetate/ethylene copolymer.

29. The polymer emulsion of claim 25 in which the polymer comprises at least one monomer selected from the group consisting of acrylic acid, methacrylic acid, acrylic esters and methacrylic esters.

* * * * *